United States Patent
Koyama et al.

(10) Patent No.: US 7,634,648 B2
(45) Date of Patent: Dec. 15, 2009

(54) DATA PROCESSING APPARATUS AND CONTROL METHOD FOR A DATA PROCESSING APPARATUS THAT TEMPORARILY PROVIDES A PLURALITY OF BOOT SECTORS IN FLASH ROM

(75) Inventors: Hisakazu Koyama, Nagano-Ken (JP); Tamakazu Kitamura, Nagano-Ken (JP); Takashi Takehana, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 549 days.

(21) Appl. No.: 11/444,952

(22) Filed: May 31, 2006

(65) Prior Publication Data
US 2007/0016763 A1 Jan. 18, 2007

(30) Foreign Application Priority Data
Jul. 12, 2005 (JP) ............... 2005-203686

(51) Int. Cl.
*G06F 15/177* (2006.01)
(52) U.S. Cl. .................. 713/2; 717/168; 717/173
(58) Field of Classification Search .......... 713/1, 713/2; 717/168, 173
See application file for complete search history.

(56) References Cited

U.S. PATENT DOCUMENTS

| | | | | |
|---|---|---|---|---|
| 6,308,265 | B1* | 10/2001 | Miller | 713/2 |
| 6,789,158 | B2* | 9/2004 | Takahashi | 711/103 |
| 6,990,577 | B2* | 1/2006 | Autry | 713/100 |
| 7,318,151 | B1* | 1/2008 | Harris | 713/2 |
| 2004/0039872 | A1 | 2/2004 | Takamizawa et al. | |

FOREIGN PATENT DOCUMENTS

| | | |
|---|---|---|
| JP | 10-097427 | 4/1998 |
| JP | 10-149282 | 6/1998 |
| JP | 2002-007152 | 1/2002 |
| JP | 2002-222093 | 8/2002 |
| JP | 2003-157204 | 5/2003 |
| JP | 2004-013536 | 1/2004 |
| JP | 2004-94628 | 3/2004 |
| JP | 2004-192329 | 7/2004 |

OTHER PUBLICATIONS

Translation—JP 2003-157204.*
U.S. Appl. No. 11/354,540.

* cited by examiner

*Primary Examiner*—Thuan N Du
(74) *Attorney, Agent, or Firm*—Nutter McClennen & Fish LLP; John J. Penny, Jr.

(57) ABSTRACT

A data processing apparatus and a control method for a data processing apparatus can start up by running a normal boot program the next time the power turns on in the event the power turns off while rewriting the boot program to flash ROM by temporarily providing a plurality of boot sectors instead of always maintaining a plurality of boot sectors in flash ROM. During the memory writing mode the flash ROM 101 is segmented into a boot selector sector 201, main sector 202, first boot sector 203, and a second boot sector 204 that is temporarily reserved by overwriting a part of the main sector 202 in the memory writing mode.

14 Claims, 10 Drawing Sheets

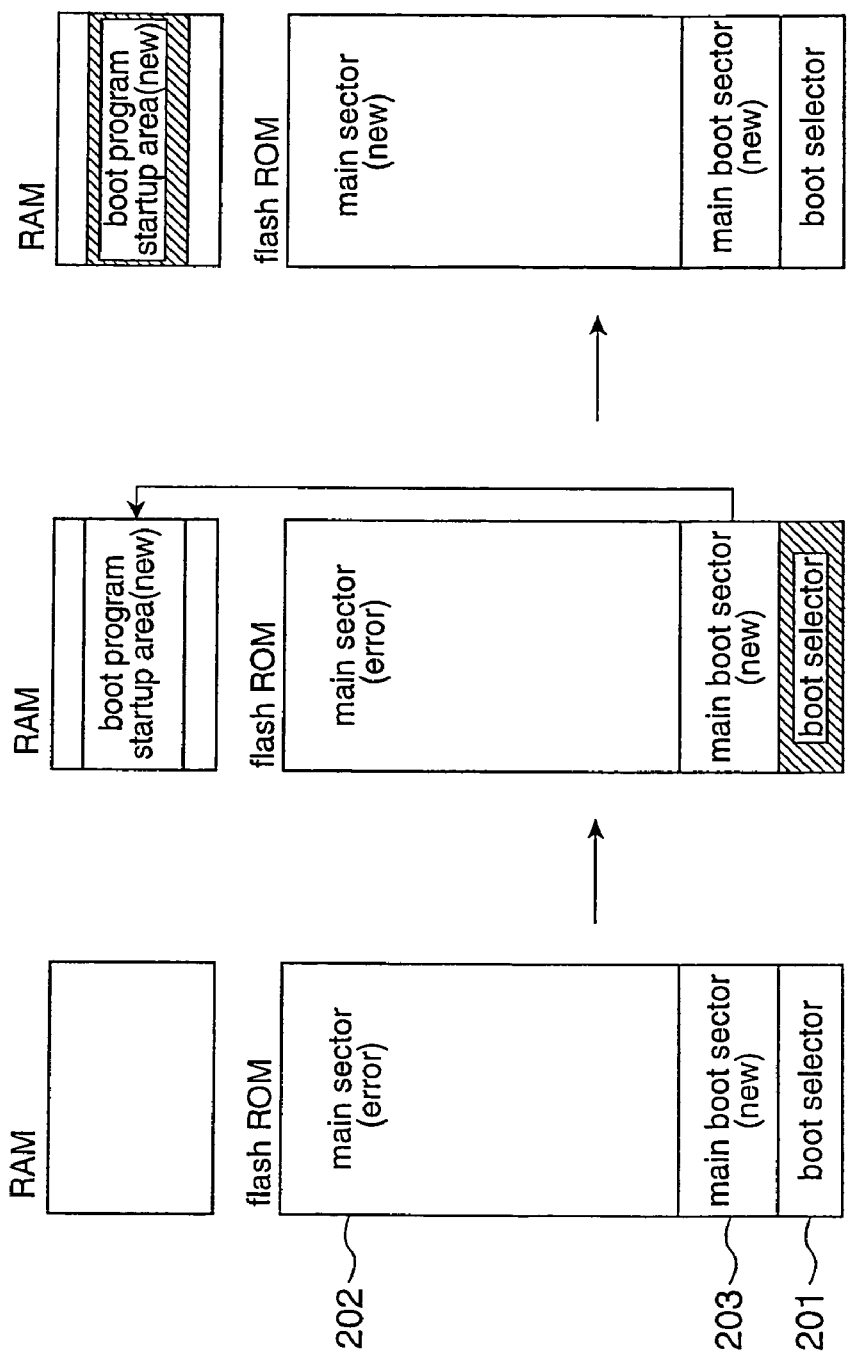

DATA PROCESSING APPARATUS AND CONTROL METHOD FOR A DATA PROCESSING APPARATUS THAT TEMPORARILY PROVIDES A PLURALITY OF BOOT SECTORS IN FLASH ROM

This application claims benefit from Japanese Application No. 2005-203686 filed on Jul. 12, 2005, which is hereby incorporated by reference in its entirety.

BACKGROUND OF THE INVENTION

1. Field of Technology

The present invention relates to a data processing apparatus and to a control method for the data processing apparatus, and relates more particularly to a memory writing process for the data processing apparatus.

2. Description of Related Art Data processing apparatuses such as printers and scanners are widely used today for personal use, business applications, and other purposes. A printer is used by way of example below as a data processing apparatus.

Modern printers have built-in firmware which is executed to control the printer. The firmware generally includes two programs: a boot program that executes a series of startup operations such as hardware initialization for starting printer operation, and a main program that runs after the boot program has finished the startup process and controls printer operation according to commands received from a host computer. The boot program and main program are stored in different sectors in flash ROM inside the printer. When the flash ROM is written to update one of the programs, for example, it can be written by sector and the boot program and main program can thus be updated separately.

A problem with this is that if writing the sector where the boot program is stored (the "boot sector") fails, the printer cannot run the boot program to start operating, and the printer is thus rendered unable to operate. To avoid this problem, Japanese Unexamined Patent Appl. Pub. 2004-94628, for example, teaches a "double-boot" method that provides a plurality of selectively read boot sectors so that if writing the boot program to one boot sector fails, the printer can still startup by running a normal boot program stored in another boot sector.

This double-boot method always maintains at least two boot sectors in flash ROM, and provides for a loss of power while writing the boot program by assuring that at least one boot program can always run.

A problem with this double-boot method, however, is that it requires flash ROM with a large storage capacity in order to assure sufficient space for two boot sectors at all times in the flash ROM. Data processing apparatuses with limited flash ROM capacity are therefore unable to use this double-boot method, and more efficient use of the available flash ROM storage space is possible and desirable. Control of this double-boot method is also complicated by the need to manage version information tracking the boot sector write sequence so that the printer knows which of the two boot sectors stores the most recent version of the boot program.

The present invention is directed to solving this problem, and an object of the invention is to provide a data processing apparatus and a control method for a data processing apparatus that can start up by running a normal boot program the next time the power turns on in the event the power turns off while rewriting the boot program to flash ROM by temporarily providing a plurality of boot sectors instead of always maintaining a plurality of boot sectors in flash ROM.

SUMMARY OF EMBODIMENTS OF THE INVENTION

To achieve the object of the invention, a data processing apparatus according to a first embodiment of the invention comprises a CPU, RAM, and rewritable flash ROM, and rewrites the flash ROM based on a write memory command from a host computer. The flash ROM comprises a boot selector sector storing boot selector data, a first boot sector storing a boot program that is started according to the boot selector data, and a main sector storing a main program that is started by the boot program; and the CPU copies a normal boot program stored in the flash ROM to RAM, and executes the copied boot program from RAM to write a new boot program received from the host computer to a second boot sector that is separate from the first boot sector in flash ROM, and then copies the new boot program written to the second boot sector to the first boot sector.

In a data processing apparatus according to a second embodiment of the invention the second boot sector is a predetermined area in the main sector.

In a data processing apparatus according to a third embodiment of the invention the CPU writes the new main program to the main sector after copying the new boot program written to the second boot sector to the first boot sector.

A data processing apparatus according to a fourth embodiment of the invention is the data processing apparatus according to any of the first to third embodiments of the invention wherein a checksum for verifying if the main program stored in the main sector is correct is stored in the main sector, a checksum for verifying if the boot program stored in the first boot sector is correct is stored in the first boot sector, and a checksum for verifying if the boot program stored in the second boot sector is correct is stored in the second boot sector. In this embodiment of the invention the CPU copies the boot program stored in the first boot sector to RAM after executing the boot selector data and verifying that the checksum stored in the first boot sector is correct; and the CPU executes the main program stored in the main sector after running the boot program from RAM and verifying that the checksum stored in the main sector is correct.

A data processing apparatus according to a fifth embodiment of the invention is the data processing apparatus according to any of the first to fourth embodiments of the invention wherein the CPU executes the flash ROM write process if the checksum stored in the main sector is wrong.

A data processing apparatus according to a sixth embodiment of the invention is the data processing apparatus according to any of the first to fifth embodiments of the invention wherein if the CPU determines by executing the boot selector data in flash ROM that the checksum stored in the second boot sector is correct, the CPU copies the boot program stored in the second boot sector to RAM and then executes the flash ROM write process.

A data processing apparatus according to a seventh embodiment of the invention is the data processing apparatus according to any of the first to sixth embodiments of the invention wherein the CPU executes an error handling process if the CPU determines by executing the boot selector data in flash ROM that the checksum stored in the first boot sector is wrong and the checksum stored in the second boot sector is also wrong.

An eighth embodiment of the invention is a control method for a data processing apparatus comprising a CPU, RAM, and rewritable flash ROM, and rewriting the flash ROM based on a write memory command from a host computer, wherein the flash ROM comprises a boot selector sector storing boot selector data, a first boot sector storing a boot program that is started according to the boot selector data, and a main sector storing a main program that is started by the boot program. The control method comprises a first step of copying the normal boot program stored in flash ROM to RAM; a second step of executing the copied boot program from RAM to write a new boot program received from the host computer to a second boot sector that is separate from the first boot sector in flash ROM; and a third step of copying the new boot program written to the second boot sector to the first boot sector.

In a data processing apparatus control method according to a ninth embodiment of the invention the second boot sector is a predetermined area in the main sector.

A data processing apparatus control method according to a tenth embodiment of the invention is the control method according to the eighth or ninth embodiment of the invention further comprising a fourth step of writing a new main program to the main sector after the third step.

A data processing apparatus control method according to an eleventh embodiment of the invention is the control method according to any of the eighth to tenth embodiments of the invention wherein a checksum for verifying if the main program stored in the main sector is correct is stored in the main sector, a checksum for verifying if the boot program stored in the first boot sector is correct is stored in the first boot sector, and a checksum for verifying if the boot program stored in the second boot sector is correct is stored in the second boot sector. This data processing apparatus control method further comprises a fifth step of verifying that the checksum stored in the first boot sector; a sixth step of copying the boot program stored in the first boot sector to RAM; and a seventh step of verifying the checksum stored in the main sector; and executes the main program if the fifth step determines that the checksum stored in the first boot sector is correct and the seventh step determines that the checksum stored in the main sector is correct.

A data processing apparatus control method according to a twelfth embodiment of the invention is the control method according to the eleventh embodiment of the invention wherein the flash ROM write process is executed if the seventh step determines that the checksum stored in the main sector is wrong.

A data processing apparatus control method according to a thirteenth embodiment of the invention is the control method according to any of the eighth to twelfth embodiments of the invention further comprising an eighth step of verifying the checksum stored in the second boot sector. This aspect of the invention copies the boot program stored in the second boot sector to RAM and executes the flash ROM write process if the eighth step determines the checksum is correct.

A data processing apparatus control method according to a fourth embodiment of the invention is the control method according to any of the eleventh to thirteenth embodiments of the invention wherein an error handling process is executed if the fifth step determines the checksum stored in the first boot sector is wrong and the eighth step determines the checksum stored in the second boot sector is wrong.

At least one embodiment of the present invention reserves a second boot sector in a predetermined area of the main sector only during the flash ROM write process. More specifically, the second boot sector and the main sector share a part of the flash ROM during the flash ROM write process. The second boot sector is thus overwritten by writing a new main program to the main sector and the second boot sector thus disappears. It is therefore not necessary to maintain a plurality of boot sectors in flash ROM at all times, and the flash ROM storage area can be used more effectively.

The CPU first copies the normal boot program stored in flash ROM to RAM, and then rewrites the flash ROM by running the boot program copied into RAM. Because the boot program that is running is not stored in flash ROM, there is no danger of the boot program that is running overwriting the boot sector where it is stored.

The invention writes a new boot program received from the host computer to a second boot sector that is separate from the first boot sector in flash ROM, and then copies the new boot program written to the second boot sector to the first boot sector. As a result, even if rewriting the second boot sector or copying to the first boot sector fails due to a write error caused by a loss of power while writing the boot program, an executable boot program always remains in one of the boot sectors, and the boot program can run the next time the power turns on.

In another aspect of at least one embodiment of the invention the CPU copies the new boot program written to the second boot sector to the first boot sector, and then writes a new main program to the main sector. By thus writing the new main program to the main sector after the new boot program is written to both the first boot sector and second boot sector, the version of the program in the written sector matches the version of the main program, and version management by data sector is not necessary.

After the CPU executes the boot selector data and determines that the checksum stored in the first boot sector is correct, the CPU copies the boot program stored in the first boot sector to RAM and runs the boot program from RAM. If the CPU then determines that the checksum stored in the main sector is correct, the CPU runs the main program stored in the main sector. The CPU can thus quickly start executing the main program because the main program can be run without verifying the checksum of the second boot sector.

If the CPU determines that the checksum stored in the main sector is wrong, the CPU executes the flash ROM write process. The write process is therefore executed to rewrite the main program the next time the power turns on if a power loss occurs while writing the main program to the main sector, and the new version of the main program can always be executed normally.

If the CPU determines that the checksum stored in the second boot sector is correct as a result of executing the boot selector data from flash ROM, the CPU copies the boot program stored in the second boot sector to RAM and then runs the flash ROM write process. The write process therefore executes again to copy the boot program from the second boot sector to the first boot sector the next time the power turns on if the power goes off while copying the boot program from the second boot sector to the first boot sector, and a normal boot program can therefore always be kept in the first boot sector.

If the CPU determines that the checksum stored in the first boot sector is wrong and the checksum stored in the second boot sector is also wrong as a result of executing the boot selector data in flash ROM, the CPU executes an error handling process. The main program will therefore not run if a boot program that can be executed normally is not present, and the data processing apparatus is thus prevented from operating abnormally. Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 10A-10C show the change in the flash ROM configuration during memory writing mode A in another situation in a printer according to a preferred embodiment of the invention.

DESCRIPTION OF THE PREFERRED EMBODIMENTS

Preferred embodiments of a data processing apparatus and a control method for a data processing apparatus according to the present invention are described below with reference to the accompanying figures.

Figure 1:
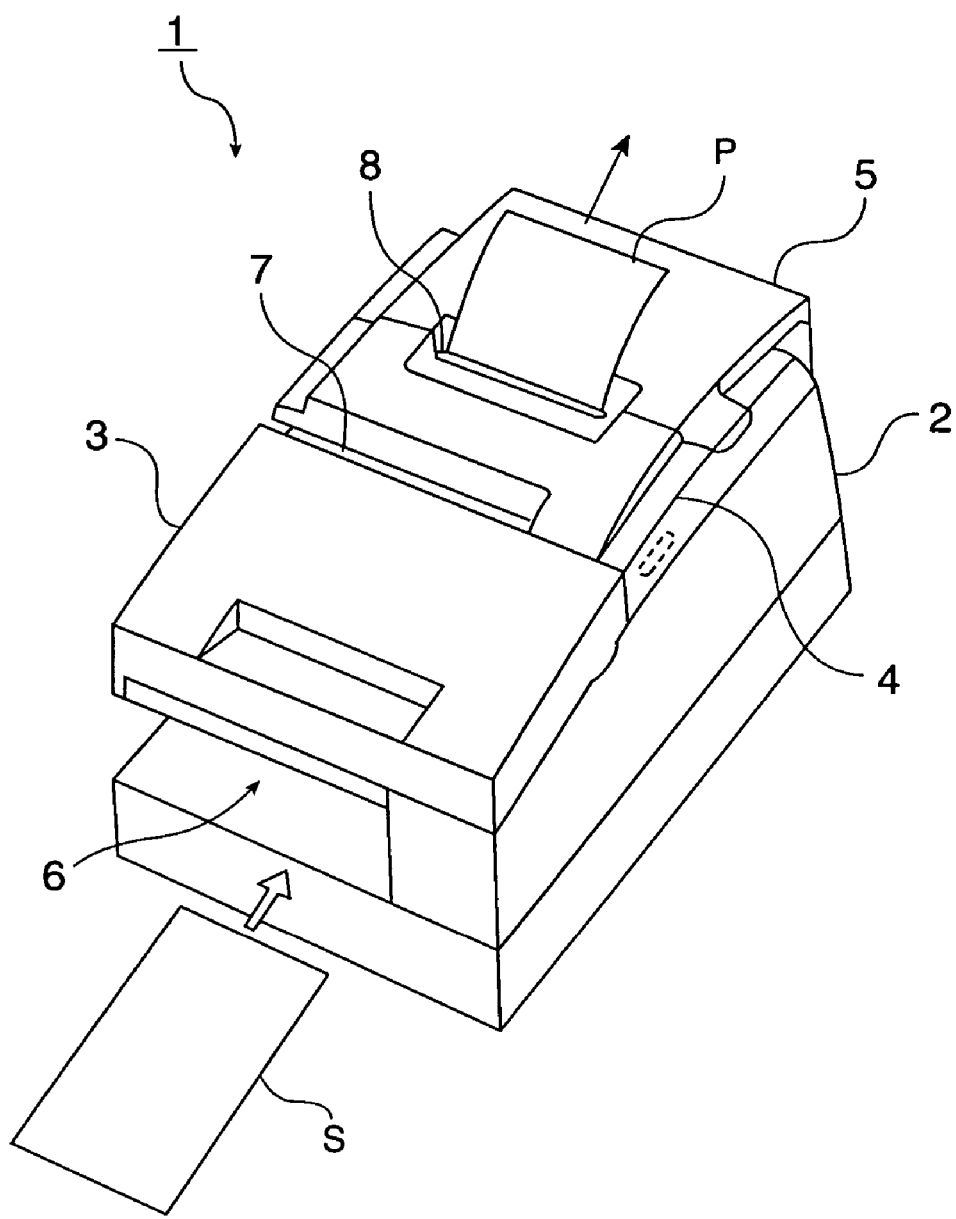
FIG. 1 is an oblique view of a printer according to a preferred embodiment of the present invention.

FIG. 1 is an oblique view of a printer 1 according to a preferred embodiment of the invention.

As shown in FIG. 1 the printer 1 in this embodiment of the invention is a hybrid printer having a slip printing unit for printing to checks and other slips S, and a roll paper printing unit for printing on roll paper P to print a sales receipt, for example.

As also shown in FIG. 1 the printer 1 has a front cover 3 and a back cover 4 disposed to open and close to the main unit 2. A top cover 5 that swings open and closed to the back cover 4 is also disposed to the back cover 4.

A slip insertion opening 6 for inserting slips S is disposed at the front of the printer 1. A slip S inserted from the slip insertion opening 6 is printed by the slip printing unit disposed inside the main unit 2 as the slip S is conveyed through the slip transportation path (not shown in the figure) inside the main unit 2. The printed slip S is then discharged from a slip exit 7 rendered between the front cover 3 and back cover 4.

Roll paper P is loaded inside the main unit 2 of the printer 1. The roll paper P is printed by a roll paper printing unit disposed inside the main unit 2 while the roll paper P is conveyed through the transportation path transportation path (not shown in the figure) disposed inside the main unit 2. The printed roll paper P is then discharged from a roll paper exit 8 rendered between the back cover 4 and top cover 5. A transportation mechanism for conveying the roll paper P and slips S along the respective transportation paths, and a recording unit for printing text and graphics to the paper being conveyed and other operating devices disposed along the transportation path, are also rendered inside the main unit 2. The printer prints by controlling the operation of these various devices.

The arrangement of the control unit 104 disposed inside the printer 1 in this embodiment of the invention is described next.

Figure 2:
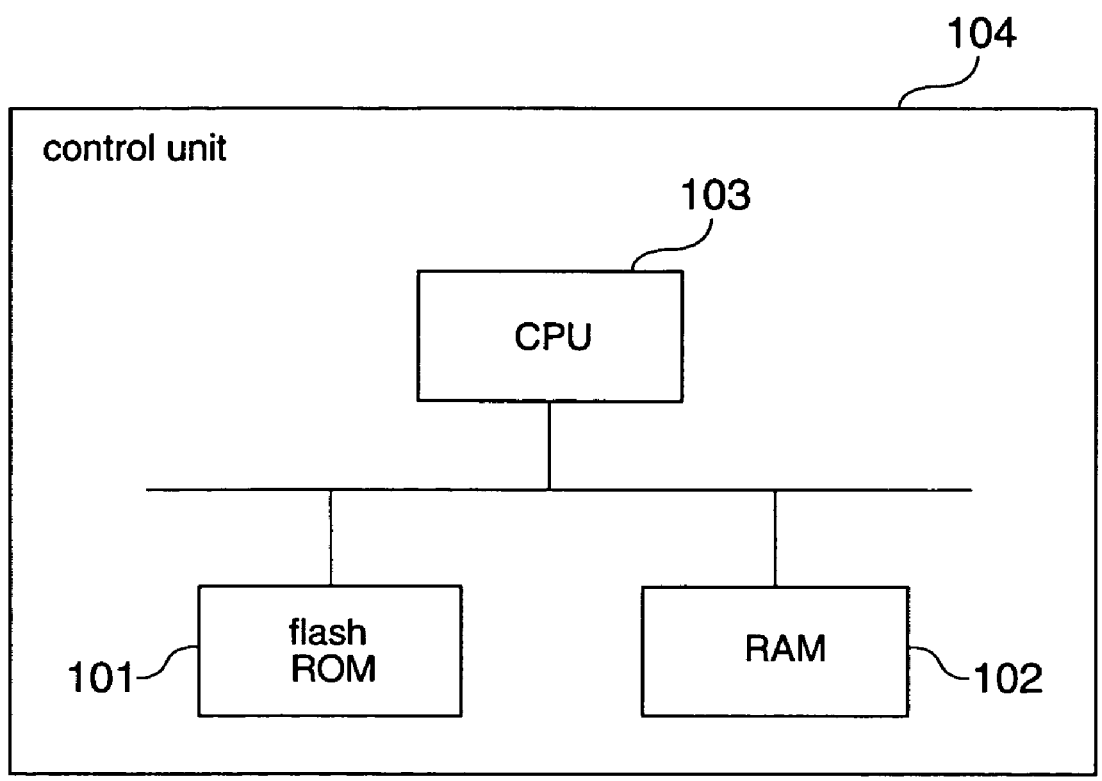
FIG. 2 shows the hardware arrangement of a printer according to an embodiment of the present invention.

FIG. 2 is a schematic block diagram of the control unit 104 of the printer 1 according to this embodiment of the invention.

The control unit 104 of this printer 1 comprises a CPU 103 as an operating unit, flash ROM 101 as nonvolatile storage, and RAM 102 as volatile storage.

Flash ROM 101 is an electrically-rewritable nonvolatile storage medium, and is segmented into a plurality of sectors. A sector is the smallest storage unit that can be erased in a single operation. Data is written to flash ROM 101 by sector unit. This flash ROM 101 stores boot selector data that controls the first stage of the initialization process, a boot program that is started after the boot selector data executes and continues the startup process, and a main program that controls the printing process of the printer 1 in the normal operating mode.

The area in flash ROM 101 where the boot selector data is stored is referred to in this embodiment of the invention as the "boot selector sector," the area where the boot program is stored is referred to as the "boot sector," and the area where the main program is stored is referred to as the "main sector." Furthermore, if the boot program or main program is stored over a plurality of sectors, the plural sectors storing the boot program are collectively referred to as the "boot sector," and the plural sectors storing the main program are collectively referred to as the "main sector."

RAM 102 is a rewritable volatile storage medium for temporarily storing data. When the control unit 104 executes a program stored in flash ROM 101, the CPU 103 reads the data from RAM 102 and executes the program, and the control unit 104 thus controls printer 1 operation.

Figure 3B:
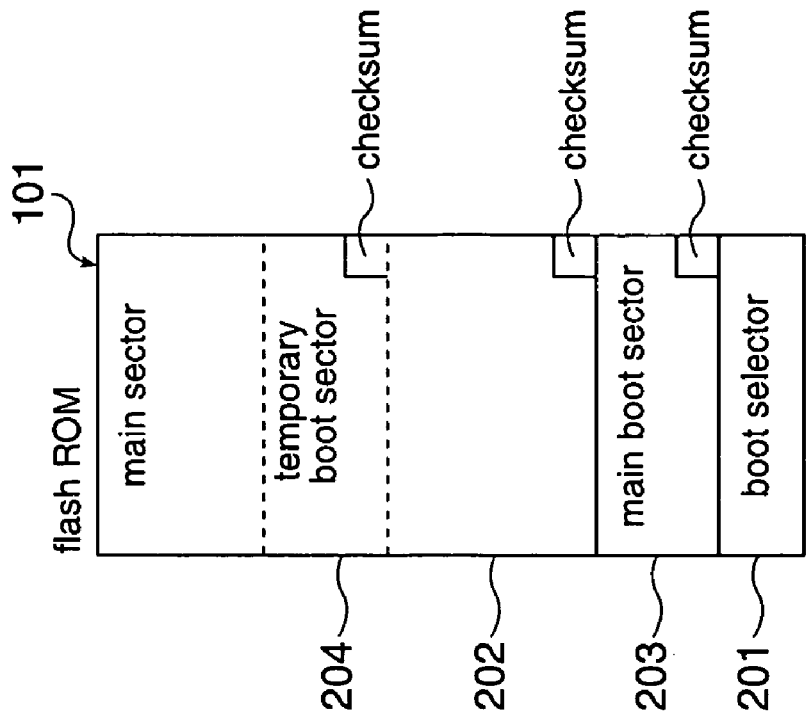
FIGS. 3A-3B are sector maps of the flash ROM.
Figure 3A:
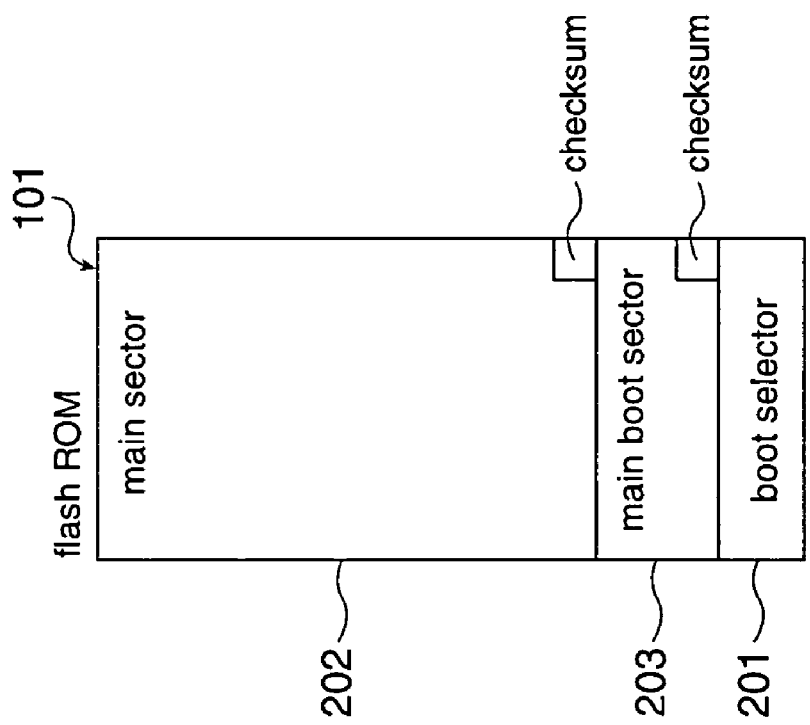

FIGS. 3A-3C are a schematic diagrams showing the storage areas in flash ROM 101. FIG. 3A shows the arrangement of the flash ROM 101 during the normal operating mode of the printer 1, and FIG. 3B shows the arrangement of the flash ROM 101 during the flash ROM 101 write process of the printer 1 (the "memory writing mode").

As shown in FIG. 3A, flash ROM 101 is segmented into a boot selector sector 201, main sector 202, and main boot sector (first boot sector) 203 when in the normal operating mode. When operating in the memory writing mode, flash ROM 101 is segmented into the boot selector sector 201, main sector 202, main boot sector 203, and a temporary boot sector (second boot sector) 204 that is reserved by overwriting a part of the main sector 202.

The boot selector sector 201 is described first below.

The boot selector sector 201 stores the boot selector data, which is the first data that is read and executed during the printer 1 initialization process. The boot selector data comprises an initial boot program that controls the initial startup process immediately after the printer 1 power turns on, and a boot selector program that decides whether to copy the boot program from the main boot sector 203 or the temporary boot sector 204 to RAM 102 after the initial boot program ends. The boot selector data is fundamentally never overwritten and executes the basic functions essential to the printer 1 startup process. The boot selector data selects the boot program in either the main boot sector 203 or temporary boot sector 204, and copies the data from the selected boot sector to RAM 102.

The basic functions essential to the printer 1 startup process include, for example, a minimal hardware check and initialization. This minimal hardware check and initialization includes, for example, checking and initializing only the devices required for the boot selector program to run until the boot program executes. More specifically, this includes checking and initializing the CPU 103, and checking and initializing a specific area in RAM 102 required to execute the boot selector program.

The boot selector data is written using the simplest possible code in order to minimize writing the boot selector sector 201 in order to fix bugs.

The main boot sector 203 and temporary boot sector 204 are described next.

The main boot sector 203 and temporary boot sector 204 store a boot program for executing the boot processes during the startup operation, and a function for overwriting the data stored in flash ROM 101. More specifically, the boot program comprises a boot program for executing the startup processes required to completely start printer 1 operation, a main program transition process for initiating the main program stored in the main sector 202 after the boot program has run, and a memory writing program for overwriting data in flash ROM 101.

The boot program stored in the main boot sector 203 and temporary boot sector 204 reinitializes and again checks the devices required to boot the printer 1, including the initialization and checking done by the initial boot program stored in the boot selector sector 201. More specifically, this boot program checks RAM 102 and CPU 103, identifies the communication interface type, executes processes needed to use the communication interface, and executes processes related to status commands.

The main boot sector 203 is always present in flash ROM 101 regardless of whether the printer 1 is in the normal operating mode or memory writing mode, but the temporary boot sector 204 is a sector that is temporarily reserved in flash ROM 101 only when the printer 1 is in the memory writing mode. More specifically, the temporary boot sector 204 is a sector that is temporarily created by overwriting to a part of the main sector 202 the new boot program that is received from the host computer (not shown in the figure), which is connected to enable communication with the printer 1, when in the memory writing mode. A printer 1 according to this embodiment of the invention thus does not always maintain a plurality of boot sectors in flash ROM 101, and can therefore efficiently use the storage area of the flash ROM when in the normal operating mode.

A checksum for verifying the boot program is also stored at the end of the boot sector in both the main boot sector 203 and temporary boot sector 204. The control unit 104 determines if the checksum is correct, selects the normal boot program from either the main boot sector 203 or temporary boot sector 204 by running the boot selector program from the boot selector sector 201, and copies the normal boot program to RAM 102. Once the normal boot program has been copied to RAM 102, the subsequent write process is executed by running the write program contained in the normal boot program copied to RAM 102. The executing program thus changes from the boot selector program to the write program contained within the boot program. This is described more fully below.

The area to which the normal boot program is copied in RAM 102 is referred to below as the "boot program startup area." This boot program startup area could be a reserved area that is not overwritten by data other than the boot program, or a working area that is overwritten by image data or print data. If the boot program startup area is part of the normal working area in RAM, it can be configured so that only the program for changing to the memory writing mode is written to a specific area that is not otherwise overwritten.

The main sector 202 is described next.

The main sector 202 stores the main program that controls the printer 1 in the normal operating mode, a call program for calling the write program from the boot program startup area in response to a write command from the host computer, and main program data such as font data and configuration parameters. The main program in the main sector 202 is called and executed after the boot program stored in the boot program startup area runs, and controls printer 1 operation in the normal operating mode.

The main sector 202 is overwritten by the write program in the boot program startup area. A checksum for verifying the main program is stored in the main sector 202 in the same way as the main boot sector 203 and temporary boot sector 204. The boot sector and main sector checksums are written at the end of the sectors as a 16-bit word in order to prevent a drop in the reliability of the normalcy check as a result of too few bits.

The functional units rendered by the CPU 103 executing programs from flash ROM 101 are described next.

Figure 4:
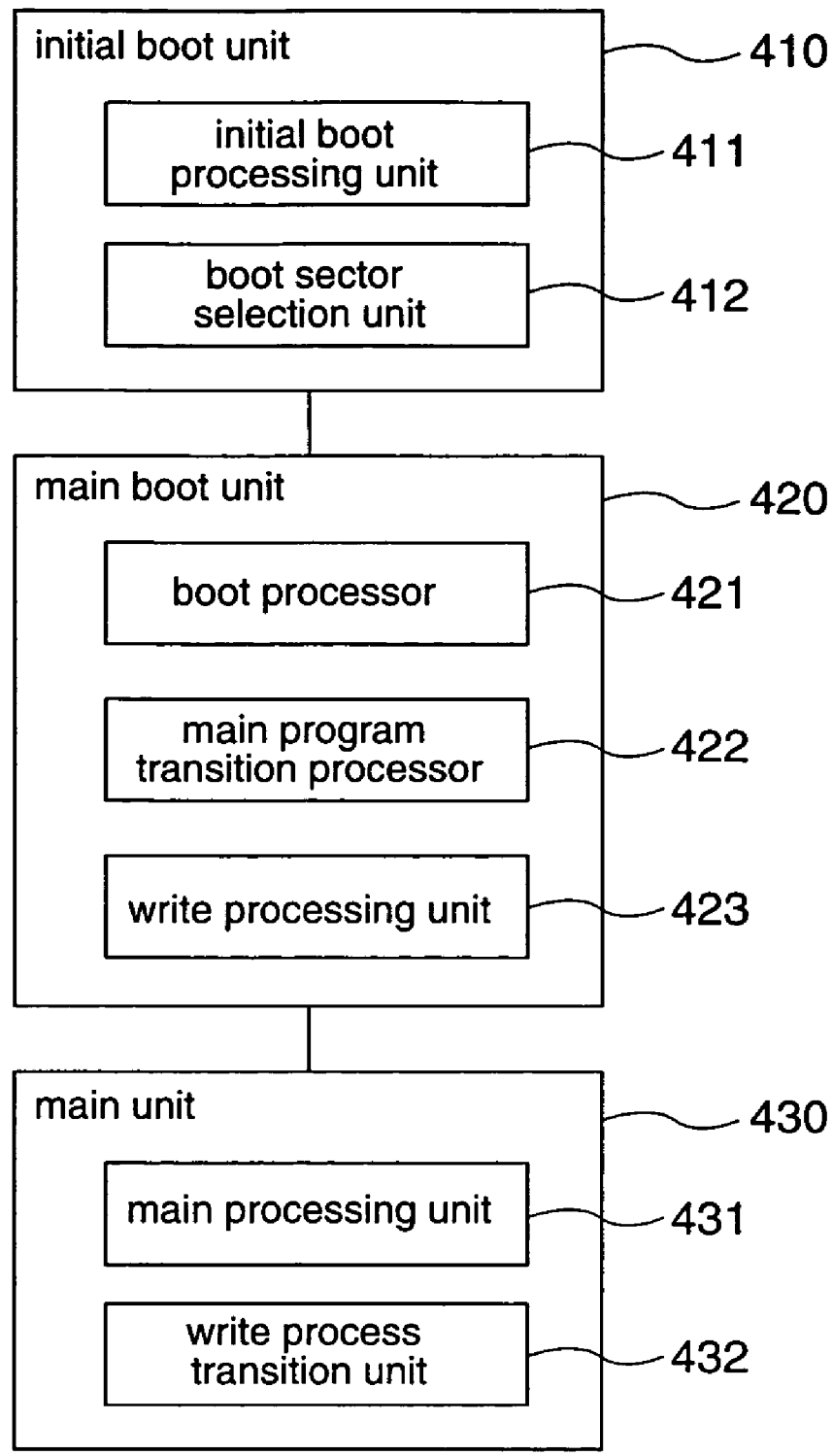
FIG. 4 is a block diagram of the CPU in a printer according to a preferred embodiment of the invention.

FIG. 4 is a schematic block diagram describing the processes of the CPU 103 in a printer 1 according to this embodiment of the invention. An initial boot unit 410, main boot unit 420, and main unit 430 are rendered in the CPU 103 as a result of the CPU 103 reading and running the programs from flash ROM 101.

The initial boot unit 410 is a function unit rendered by running the boot selector data of the boot selector sector 201. The initial boot unit 410 runs the initial boot program to render an initial boot processing unit 411 that executes the initial startup process immediately after printer 1 power turns on, and a boot sector selection unit 412 that executes the boot selector program to select the boot program from the main boot sector 203 or temporary boot sector 204 for copying to the boot program startup area in RAM 102 after the initial boot program runs. The boot sector selection unit 412 runs the error handling process of the printer 1 if it determines that the checksum is wrong for both the main boot sector and the temporary boot sector.

The main boot unit 420 is a function unit that is rendered by reading and running the boot program copied to the boot program startup area of RAM 102. The main boot unit 420 comprises a boot processor 421, a main program transition processor 422, and a write processing unit 423.

The boot processor 421 runs the boot program to execute the startup processes required to completely start. operation of printer 1. The main program transition processor 422 runs the main program transition process to activate the main program in the main sector 202 after the boot program has run. The write processing unit 423 runs the write program to execute the process for writing data to flash ROM 101.

After the boot process run by the boot processor 421 ends, the main program transition processor 422 determines whether to read and run the main program from the main sector 202. More specifically, if the checksum of the main sector 202 is correct, the main program is read from the main sector 202 and the printing process or other operation is run. If the checksum is incorrect, the main program transition processor 422 passes control to the write processing unit 423.

The write processing unit 423 overwrites the boot program in the main boot sector 203 or the main program in the main sector 202. After writing the program, the write processing unit 423 recalculates the checksum for the overwritten boot program or main program, and updates the checksum.

The main unit 430 runs the main program while referencing font data and other configuration parameters, and thus renders a main processing unit 431 for controlling printer 1 operation in the normal operating mode, and a write process transition unit 432 that is activated by an overwrite command sent from the host computer.

The main processing unit 431 controls the printer in the normal operating mode to print by controlling the different driver units of the printer 1 while communicating with the host computer. Control always returns to the main processing unit 431 after other operations are completed to drive and control the printer 1 whenever the printer 1 is not in the memory writing mode.

When a write memory command is received from the host computer while the main processing unit 431 is operating, the write process transition unit 432 passes control to the write processing unit 423. More specifically, if a write memory command is received while the main processing unit 431 is operating, this embodiment of the invention unconditionally passes control to the memory writing mode without rebooting.

The startup process of a printer 1 according to this embodiment of the invention is described next with reference to FIG. 5.

Figure 5:
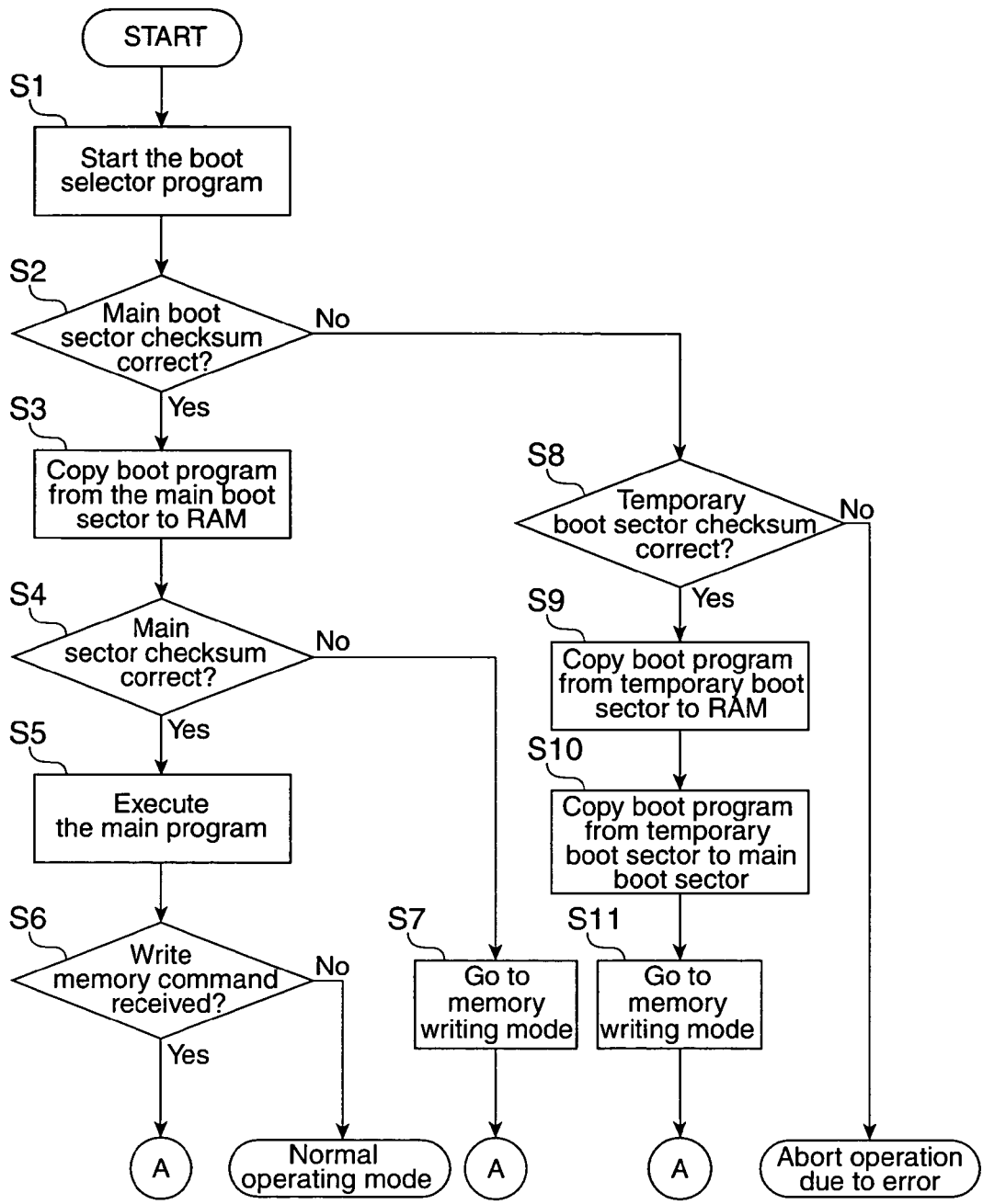
FIG. 5 is a flow chart of the startup process in a printer according to a preferred embodiment of the invention.

FIG. 5 is a flow chart of the printer 1 startup process in this embodiment of the invention.

Processing from when the power turns on until the normal operating mode is enabled When the printer 1 power turns on, the initial boot processing unit 411 calls the boot selector data stored in the boot selector sector 201 (step S1), and runs the initial startup process of the printer 1 by executing the initial boot program portion of the boot selector data. After running the initial boot program, the boot sector selection unit 412 runs the boot selector program to determine whether to copy the boot program from the main boot sector 203 or the temporary boot sector 204 to RAM 102.

Once the boot selector program starts, the boot sector selection unit 412 verifies the checksum stored in the main boot sector 203 (step S2). If the checksum of the main boot sector 203 is correct, the boot sector selection unit 412 copies the boot program from the main boot sector to a predetermined area in RAM 102 (the boot program startup area) (step S3).

Once the boot program is copied to the boot program startup area in RAM 102, the executing program switches from the boot selector program stored in boot selector sector 201 to the boot program that was copied from the main boot sector 203 into the boot program startup area. The boot processor 421 then starts the boot program to execute the processes required to completely enable and start printer 1 operation.

The main program transition processor 422 then verifies the checksum stored in the main sector 202 (step S4). If the checksum of the main sector 202 is correct, the main program transition processor 422 starts the main program transition process portion of the boot program, and passes control to the main program. The main processing unit 431 runs the main program stored in the main sector (step S5), enters the normal operating mode controlling the printing process of the printer 1, for example, and continues operating in the normal operating mode unless a write memory command is received from the host computer while the main program is executing (step S6).

The process for entering the memory writing mode while the main program is running is described next.

If a write memory command is received from the host computer while the main program is executing, the main processing unit 431 enters a memory writing mode (step S6). The write process transition unit 432 passes control to the write processing unit 423 when a write memory command is received from the host computer while the main processing unit 431 is operating. More specifically, if a write memory command is received while the main program is active, the boot program is read directly from the main boot sector without restarting, and memory writing mode A is enabled.

The process of entering the memory writing mode when power turns on is described next.

If the checksum of the main sector 202 is determined to be wrong in step S4, the memory writing mode for overwriting the main program in the main sector 202 is selected (step S7). More specifically, memory writing mode A must be enabled again because the printer 1 power went off while writing the main sector 202 or the power went off while writing the temporary boot sector 204, and the process of writing the program to the main sector 202 or to the temporary boot sector 204 and main sector 202 did not finish.

The process of entering the memory writing mode when power turns on is described next.

When printer 1 power turns on, the initial boot processing unit 411 calls the boot selector data stored in the boot selector sector 201 (step S1), and runs the initial startup process of the printer 1 by executing the initial boot program portion of the boot selector data. After running the initial boot program, the boot sector selection unit 412 runs the boot selector program to determine whether to copy the boot program from the main boot sector 203 or the temporary boot sector 204 to RAM 102.

Once the boot selector program starts, the boot sector selection unit 412 verifies the checksum stored in the main boot sector 203 (step S2). If the checksum of the main boot sector 203 is not correct, the boot sector selection unit 412 verifies the checksum stored in the temporary boot sector 204 (step S8). If the checksum of the temporary boot sector 204 is correct, the boot sector selection unit 412 copies the boot program from the temporary boot sector to a predetermined area in RAM 102 (the boot program startup area) (step S9), and then copies the boot program from temporary boot sector 204 to the main boot sector 203 (step S10).

Once the boot program is copied to the boot program startup area in RAM 102, the executing program switches from the boot selector program stored in boot selector sector 201 to the boot program that was copied from the temporary boot sector 204 into the boot program startup area. The boot processor 421 then starts the boot program to execute the processes required to completely enable and start printer 1 operation.

After the boot program is copied from the verified temporary boot sector to the predetermined area in RAM 102 (the boot program startup area), the write processing unit 423 rewrites the boot program in the main boot sector and the main program in the main sector 202 (step S11). More specifically, memory writing mode A must be enabled again because the printer 1 power went off while copying the boot program from the temporary boot sector 204 to the main boot sector 203, and the process of writing the program to the main boot sector 203 and main sector 202 did not finish.

A printer 1 according to this embodiment of the invention thus always enters the memory writing mode the next time the power turns on if the memory writing process is interrupted because the power turns off while in the memory writing mode. The flash ROM 101 thus always stores program data that has been written correctly, and problems resulting from printer 1 operating errors are eliminated.

Aborting due to an error when power turns on

If step S8 determines that the checksum of the 204 is wrong, printer 1 operation aborts due to an error. More specifically, if the checksums of both the main boot sector 203 and the temporary boot sector 204 are wrong, a boot program that can complete the normal startup process is not stored in flash ROM 101. Because the printer 1 in this embodiment of the invention thus aborts operation when a boot program that is capable of normally booting the printer is not stored in flash ROM 101, the main program never runs and the printer 1 will not operate incorrectly.

The boot sector selection unit 412 in this embodiment of the invention runs the process stored in the main sector without verifying the checksum of the temporary boot sector if the checksum of the main boot sector is first verified to be correct. As shown in the flow chart in FIG. 6, however, the checksum of the temporary boot sector could be verified first (step S14), and the memory writing process could be executed without verifying the checksum of the main boot sector if the checksum of the temporary boot sector is correct.

Figure 6:
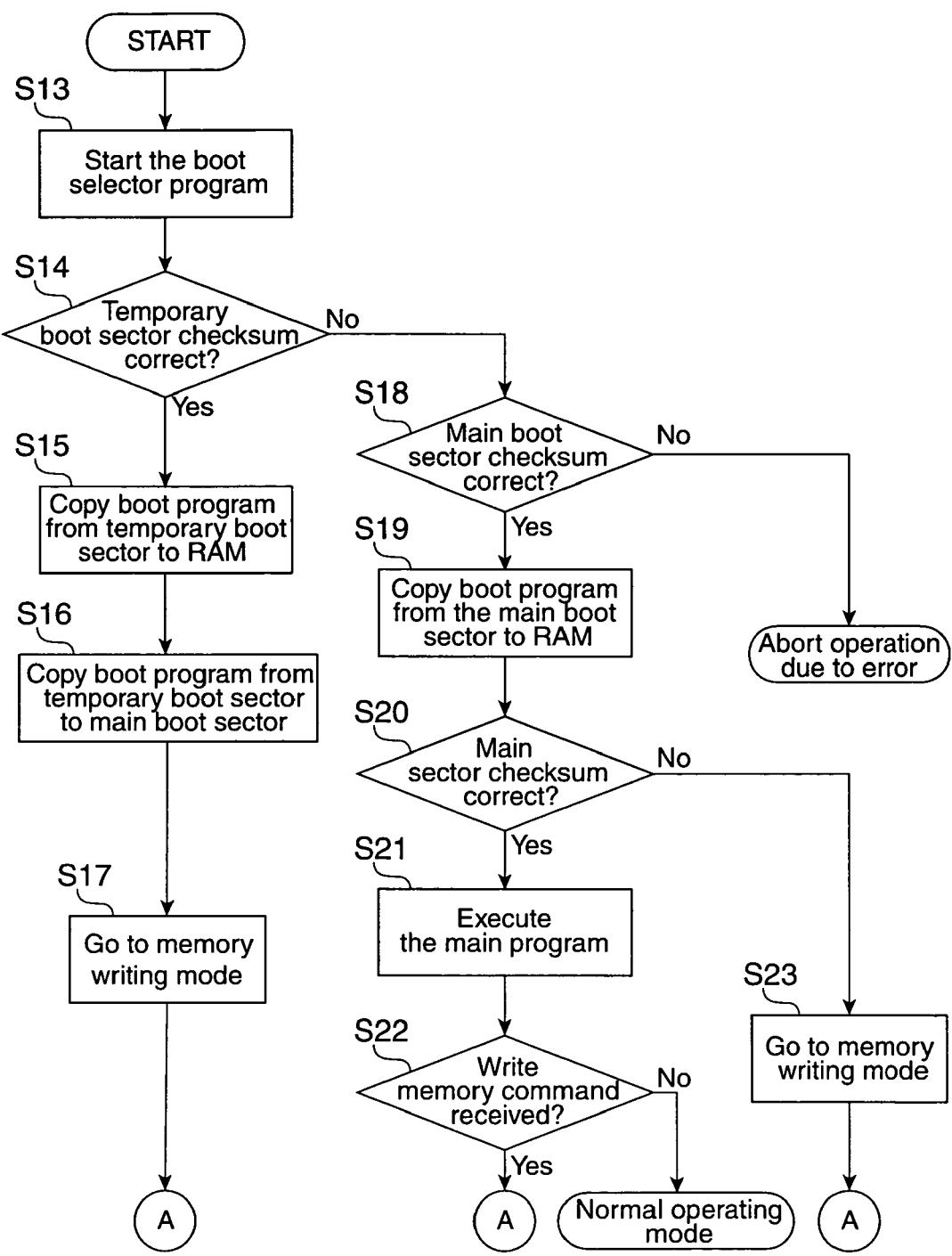
FIG. 6 is a flow chart of another startup process in a printer according to a preferred embodiment of the invention.

More specifically, if the checksum of the temporary boot sector 204, which is rendered temporarily by overwriting a part of the main sector 202, is correct, the old version of the main program in main sector 202 has not been overwritten and the memory writing mode must therefore be enabled. Because the memory writing mode A is enabled by executing the five steps from S13 to S17 as shown in FIG. 6, the printer can quickly enter the memory writing mode.

Note that when the checksum of the main boot sector is verified first as shown in FIG. 5, the normal operating mode can be quickly enabled because the main program is started with the five steps from step S1 to S5.

Operation from when the power of a printer 1 according to this embodiment of the invention turns on until memory writing mode A ends is described next with reference to FIG. 7 to FIG. 10.

Figure 7:
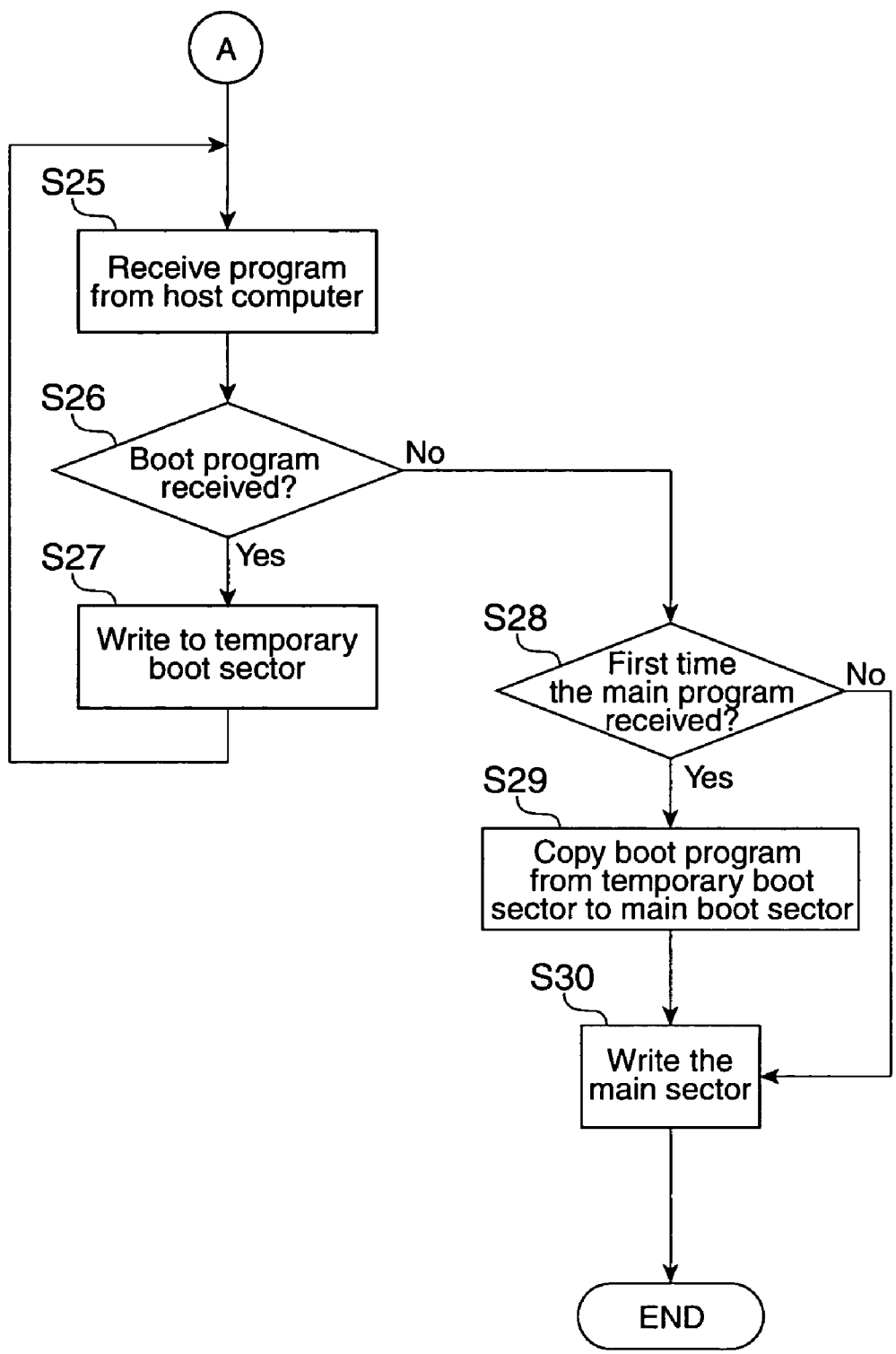
FIG. 7 is a flow chart of memory writing mode A in a printer according to a preferred embodiment of the invention.

FIG. 7 is a flow chart of the memory writing mode A in a printer 1 according to this embodiment of the invention.

Memory writing mode A when the power turns off while writing the temporary boot sector 204

Figures 8A, 8B, 8C, 8D, 8E:
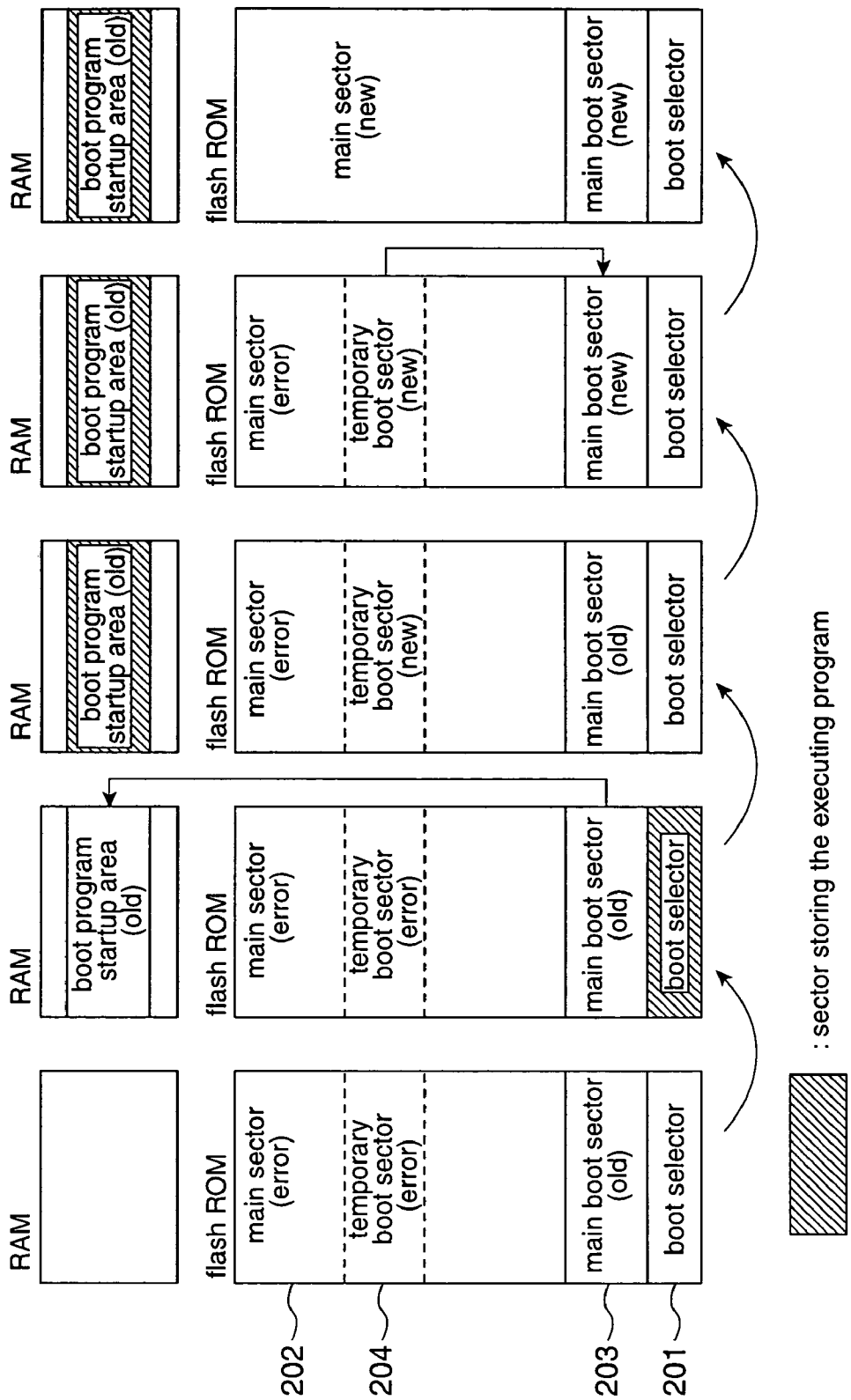
FIGS. 8A-8E show the change in the flash ROM configuration during memory writing mode A in a printer according to a preferred embodiment of the invention.

FIG. 8A shows the structure of flash ROM 101 when printer 1 power turns on after the writing of temporary boot sector 204 fails, the temporary boot sector 204 and thus the main sector 202 are both in error, and the boot program stored in the main boot sector is the old boot program. In this situation the printer 1 copies the boot program from the normal main boot sector 203 to the boot program startup area of RAM 102 as shown in FIG. 8B.

If a write memory command is then received from the host computer to rewrite either the boot program or main program (step S25), the old boot program in the boot program startup area then starts. If the printer 1 receives the boot program (step S26 returns Yes), the new boot program received from the host computer is written to the temporary boot sector 204 (step S27, FIG. 8C).

If the printer 1 receives the main program (step S26 returns No), whether the main program was received for the first time is determined (step S28). Because the power turned off before the main program was received the last time the memory writing mode was enabled, the main program is received for the first time in this case (step S28 returns Yes). The new boot program written to the temporary boot sector 204 is then copied to the main boot sector 203 (step S29, FIG. 8D). The main sector 202 is then rewritten using the new main program received from the host computer in step S30 (see FIG. 8E).

Memory writing mode A when the power turns off while copying the boot program from the temporary boot sector 204 to the main boot sector 203

Figures 9A, 9B, 9C, 9D:
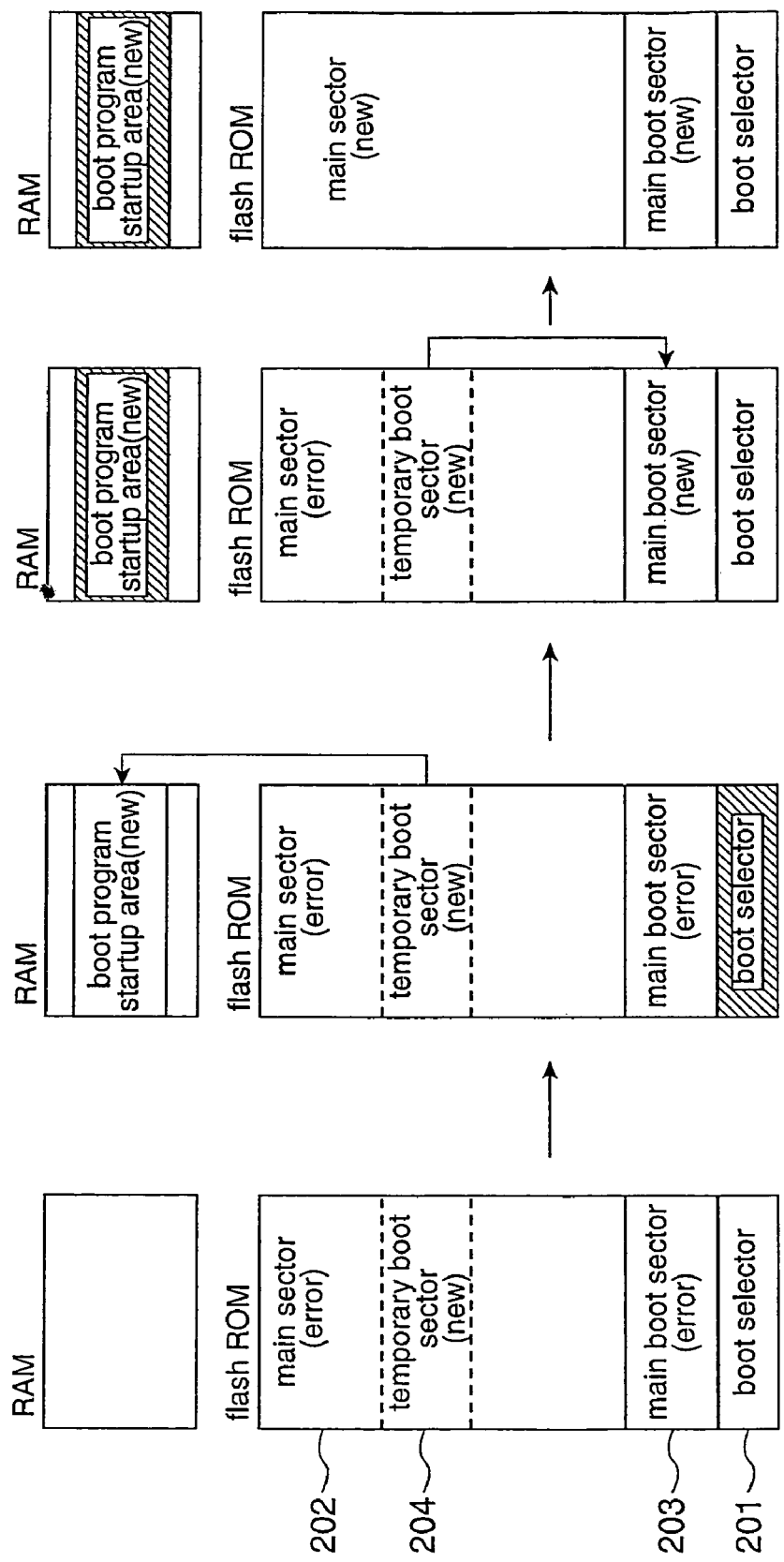
FIGS. 9A-9D show the change in the flash ROM configuration during memory writing mode A in another situation in a printer according to a preferred embodiment of the invention.

The configuration of flash ROM 101 when the printer 1 power turns on in this case is shown in FIG. 9A. This situation occurs when copying the boot program from the temporary boot sector 204 to the main boot sector 203 fails and the main boot sector 203 is thus in error. In this case the printer 1 copies the new boot program from the normal temporary boot sector 204 to the boot program startup area in RAM 102 as shown in FIG. 9B.

The printer 1 thus receives a write memory command from the host computer to write the boot program or main program (step S25). The new boot program thus runs from the boot program startup area, and if the printer 1 determines that the main program was received (step S26 returns No), whether the main program was received for the first time is determined (step S28). Because the power turned off before the main program was received the last time the memory writing mode was enabled, the main program is received for the first time in this case, too (step S28 returns Yes). The new boot program written to the temporary boot sector 204 is then copied to the main boot sector 203 (step S29, FIG. 9C). The main sector 202 is then rewritten using the new main program received from the host computer in step S30 (see FIG. 9D).

Memory writing mode A when the power turns off while writing the main sector 202

The configuration of flash ROM 101 when the printer 1 power turns on in this case is shown in FIG. 10A. This situation occurs when writing the main sector 202 fails and the main program stored in the main sector 202 is in error. In this case, the printer 1 copies the new boot program from the normal main boot sector 203 to the boot program startup area in RAM 102 as shown in FIG. 10B.

The printer 1 thus receives a write memory command from the host computer to write the boot program or main program (step S25). The new boot program thus runs from the boot program startup area, and if the printer 1 determines that the main program was received (step S26 returns No), whether the main program was received for the first time is determined (step S28). Because the main program was received during the previous memory writing mode but the power turned off while writing the main program, the main program received in this case is at least the second time the main program was received (step S28 returns No). The main sector 202 is thus rewritten in step S30 using the new main program received from the host computer (FIG. 10C).

The boot program startup area in this embodiment of the invention is reserved as the boot program storage area after the boot program is copied normally, but the memory could be released for storing other data. While the boot program comprises a boot process, main program transition process, and memory writing process, it is possible to leave only the memory writing program in RAM 102 and overwrite the other portions of the boot program with other data. The processing performance of the printer 1 can be improved by thus releasing RAM 102 to store other data. Furthermore, if only the memory writing program is left in the boot program startup area or other part of RAM 102, the memory writing mode can be quickly activated when unconditionally entering the memory writing mode while the main program is executing because there is no need to copy the boot program to RAM 102 again.

Furthermore, the temporary boot sector 204 is rendered in the main sector 202 in this embodiment of the invention, but the temporary boot sector 204 could be reserved in a part of flash ROM 101 other than the main sector 202.

This embodiment of the invention provides the temporary boot sector 204 in a predetermined area of the main sector 202 only when writing to flash ROM 101. That is, the temporary boot sector 204 and main sector 202 share the same space when writing to flash ROM 101. Because the temporary boot sector is thus overwritten and erased by writing the new main program to main sector 202, a plurality of boot sectors is not always present in flash ROM 101 and the storage area of flash ROM 101 can be used more effectively.

The CPU 103 in this embodiment of the invention writes to flash ROM 101 by first copying the normal boot program from flash ROM 101 to RAM 102 and then running the boot program from RAM 102. That is, because the boot program being executed is not present in flash ROM 101, the executing boot program will not try to write to the sectors where the executing boot program is stored.

This embodiment of the invention also overwrites the temporary boot sector 204 with the new boot program in response to a write memory command from the host computer, and then copies the new boot program to the main boot sector. A normal boot program can thus be executed the next time the power turns on because a normal boot program remains on one of the boot sectors even if writing to temporary boot sector 204 or copying to the main boot sector 203 fails due to a write error caused by the power turning off while writing the boot program.

This embodiment of the invention copies the new boot program to the main boot sector 203 and then writes the new main program to the main sector 202 based on a write memory command from the host computer. The desired versions of the programs can thus be maintained in the sectors that are overwritten and sector by sector version management is not needed because the new main program is written to the main sector 202 only after writing the new boot program to both the main boot sector 203 and temporary boot sector 204.

This embodiment of the invention executes the main program stored in the main sector 202 if the checksum stored in the main sector 202 is determined to be correct after the boot sector selection unit 412 of the CPU 103 first determines that the checksum stored in the main boot sector 203 is correct and then copies the boot program stored in the main boot sector to RAM 102. The normal operating mode can thus be quickly activated because the main program can be executed without verifying that the checksum of the temporary boot sector 204 is correct.

When the main program transition processor 422 of the CPU 103 determines that the checksum stored in the main sector 202 is wrong, this embodiment of the invention runs the process to rewrite flash ROM 101. A normal main program can therefore always be held in memory because the rewrite process is always run to rewrite the main program the next time the power turns on if the power turned off while writing the main program to the main sector 202.

If the boot sector selection unit 412 of the CPU 103 determines that the checksum of the temporary boot sector 204 is correct, the boot program stored to the temporary boot sector 204 is copied to RAM 102 and the flash ROM 101 write process is then executed. A normal boot program is therefore always kept in the main boot sector 203 even if the power turns off while copying the boot program from the temporary boot sector 204 to the main boot sector 203 because the write process is always executed again to copy the boot program from the temporary boot sector 204 to the main boot sector 203 the next time the power turns on.

A printer 1 according to this embodiment of the invention also aborts the startup process if the boot sector selection unit 412 of the CPU 103 determines that the checksum of the main boot sector 203 and the checksum of the temporary boot sector 204 are both wrong. Problems caused by the printer 1 operating incorrectly are thus prevented because the main program is never executed if a boot program that operates normally cannot be found.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

For example, NV memory, such as EEPROM is substituted for flash ROM.

What is claimed is:

1. A data processing apparatus comprising a CPU, RAM, and flash ROM, wherein the flash ROM is rewritten based on a write memory command from a host computer, and wherein:

the flash ROM comprises a boot selector sector storing boot selector data, a first boot sector storing a boot program that is started according to the boot selector data, and a main sector storing a main program that is started by the boot program; and the CPU copies a normal boot program stored in the flash ROM to RAM, and executes the copied boot program from RAM to write a new boot program received from the host computer to a second boot sector that is separate from the first boot sector in flash ROM, and then copies the new boot program written to the second boot sector to the first boot sector, such that said first boot sector and said second boot sector are maintained in said flash ROM only when the new boot program is written to said second boot sector.

2. The data processing apparatus described in claim 1, wherein the second boot sector is a predetermined area in the main sector.

3. The data processing apparatus described in claim 1, wherein the CPU writes the new main program to the main sector after copying the new boot program written to the second boot sector to the first boot sector.

4. The data processing apparatus described in claim 1, wherein:

a checksum for verifying if the main program stored in the main sector is correct is stored in the main sector, a checksum for verifying if the boot program stored in the first boot sector is correct is stored in the first boot sector, and a checksum for verifying if the boot program stored in the second boot sector is correct is stored in the second boot sector;

the CPU copies the boot program stored in the first boot sector to RAM after executing the boot selector data and verifying that the checksum stored in the first boot sector is correct; and the CPU executes the main program stored in the main sector after running the boot program from RAM and verifying that the checksum stored in the main sector is correct.

5. The data processing apparatus described in claim 1, wherein the CPU executes the flash ROM write process if the checksum stored in the main sector is wrong.

6. The data processing apparatus described in claim 1, wherein if the CPU determines by executing the boot selector data in flash ROM that the checksum stored in the second boot sector is correct, the CPU copies the boot program stored in the second boot sector to RAM and then executes the flash ROM write process.

7. The data processing apparatus described in claim 1, wherein the CPU executes an error handling process if the CPU determines by executing the boot selector data in flash ROM that the checksum stored in the first boot sector is wrong and the checksum stored in the second boot sector is also wrong.

8. A control method for a data processing apparatus comprising a CPU, RAM, and flash ROM, wherein the flash ROM is rewritten based on a write memory command from a host computer, and wherein the flash ROM comprises a boot selector sector storing boot selector data, a first boot sector storing a boot program that is started according to the boot selector data, and a main sector storing a main program that is started by the boot program, the control method comprising:
   a) copying the normal boot program stored in the flash ROM to RAM;
   b) executing the copied boot program from RAM to write a new boot program received from the host computer to a second boot sector that is separate from the first boot sector in the flash ROM; and
   c) copying the new boot program written to the second boot sector to the first boot sector, such that said first boot sector and said second boot sector are maintained in said flash ROM only when the new boot program is written to said second boot sector.

9. The data processing apparatus control method described in claim 8, wherein the second boot sector is a predetermined area in the main sector.

10. The data processing apparatus control method described in claim 9, further comprising:
   d) writing a new main program to the main sector after step c).

11. The data processing apparatus control method described in claim 8, wherein:
   a checksum for verifying if the main program stored in the main sector is correct is stored in the main sector, a checksum for verifying if the boot program stored in the first boot sector is correct is stored in the first boot sector, and a checksum for verifying if the boot program stored in the second boot sector is correct is stored in the second boot sector;
   the data processing apparatus control method further comprises:
   e) verifying that the checksum stored in the first boot sector;
   f) copying the boot program stored in the first boot sector to RAM; and
   g) verifying the checksum stored in the main sector; and
   executes the main program if step e) determines that the checksum stored in the first boot sector is correct and step g) determines that the checksum stored in the main sector is correct.

12. The data processing apparatus control method described in claim 11, wherein the flash ROM write process is executed if step g) determines that the checksum stored in the main sector is wrong.

13. The data processing apparatus control method described in claim 12, further comprising:
   h) verifying the checksum stored in the second boot sector;
   wherein the boot program stored in the second boot sector is copied to RAM and the flash ROM write process is executed if step h) determines the checksum is correct.

14. The data processing apparatus control method described in claim 13, wherein an error handling process is executed if step e) determines the checksum stored in the first boot sector is wrong and step h) determines the checksum stored in the second boot sector is wrong.

* * * * *

UNITED STATES PATENT AND TRADEMARK OFFICE
CERTIFICATE OF CORRECTION

PATENT NO. : 7,634,648 B2  
APPLICATION NO. : 11/444952  
DATED : December 15, 2009  
INVENTOR(S) : Koyama et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 747 days.

Signed and Sealed this

Ninth Day of November, 2010

David J. Kappos
*Director of the United States Patent and Trademark Office*